(12) United States Patent  (10) Patent No.: US 7,941,890 B1
Alexander et al.  (45) Date of Patent: May 17, 2011

(54) WINDOW CLEANING SYSTEM FOR VEHICLES

(76) Inventors: Gary Alexander, Marrero, LA (US); James E. Crockett, Marrero, LA (US)

( * ) Notice: Subject to any disclaimer, the term of this patent is extended or adjusted under 35 U.S.C. 154(b) by 1131 days.

(21) Appl. No.: 11/300,844

(22) Filed: Dec. 16, 2005

(51) Int. Cl.
B60S 1/44 (2006.01)
B60S 1/56 (2006.01)
B60S 1/46 (2006.01)

(52) U.S. Cl. .......... 15/250.01; 15/250.1; 15/250.02; 15/250.28

(58) Field of Classification Search .......... 15/250.1, 15/250.01, 250.04, 250.22, 250.29, 250.28, 15/250.001, 250.02
See application file for complete search history.

(56) References Cited

U.S. PATENT DOCUMENTS

| | | | |
|---|---|---|---|
| 3,579,698 A | 5/1971 | Verdoodt et al. | |
| 3,671,144 A | 6/1972 | Kuck | |
| 3,686,705 A | 8/1972 | Parker et al. | |
| 3,849,827 A | 11/1974 | Coropolis et al. | |
| 5,339,488 A | 8/1994 | Maass | |
| D468,675 S | 1/2003 | Murkett | |
| 7,257,855 B2 * | 8/2007 | Mayo | 15/250.04 |

FOREIGN PATENT DOCUMENTS

GB   2326084   * 12/1998

* cited by examiner

Primary Examiner — Gary K Graham

(57) ABSTRACT

A window cleaning system includes a control panel that has independently operable switches electrically coupled thereto. A reservoir for housing window washing fluid is nested within an engine compartment. Power operated pumps are mated to the control panel and are in fluid communication with the reservoir. Fluid dispensing assemblies are conjoined to the pumps and are independently activated for soaking a unique vehicle door window. Fluid wiping implements are situated above the fluid dispensing assemblies and cooperate with the fluid dispensing assemblies for automatically removing excess fluid from the door windows. Collection bins include funnels attached to a top surface thereof that receive and store runoff fluids from the door windows. The collection bins include plugs connected thereto for draining runoff water outwardly and away from the vehicle doors. Filters are seated subjacent to the funnels for preventing debris from being deposited into the collection bins.

14 Claims, 3 Drawing Sheets

WINDOW CLEANING SYSTEM FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to window cleaning systems and, more particularly, to a window cleansing system for vehicles for washing a plurality of vehicles door windows.

2. Prior Art

During the normal driving operations of any vehicle a certain amount of dirt, debris and grime from the road and the environment are deposited onto the vehicle's body and windows. The impact of such deposits on the body of the vehicle is not significant to the driver, unless they are particular about having their automobile in pristine conditions at all times. Such deposits located on windows, however, can greatly impair a vehicle operator's line of sight to an exterior of the vehicle.

Due to this, all vehicles are required to be equipped with means to at least clean the front windshield of the vehicle. Some vehicles are also equipped with a mechanism to clean the rear window of the vehicle for providing a rearward line of sight in the event that the driver must reverse or wishes to observe trailing traffic. The need to see out of such side windows becomes vital with procedures like lane changes, parallel parking and driving back wards just to name a few. The only method of cleaning such side windows on a vehicle, though, is to carry about a chemical cleanser and either a cloth, rag or paper towels that can be used to clean the windows when required.

This requires the vehicle operator to pull over and manually go about cleaning their car. Obviously, this is a very tedious and time consuming practice, especially on long distance trips where keeping a close time schedule may be very important. Also, transporting the required cleaning materials consumes valuable trunk or cabin storage space that can be better used for personal items such as clothing and other necessities.

Accordingly, a need remains for a window cleansing system for vehicles in order to overcome the above-noted shortcomings. The present invention satisfies such a need by providing a window cleansing system that is convenient to use, safe to operate and effectively cleans the vehicle's door windows. Instead of struggling to see through the side windows due to pollen, smeared finger prints, dust, and grime, the system washes and cleans the glass with the simple push of a button. Such a window cleansing system eliminates the inconvenient transportation of special cleaning fluids, rags, or rolls of paper towels to manually clean the windows. This advantageously eliminates unwanted hassles and storage concerns, saving the user a considerable amount of time and frustration.

BRIEF SUMMARY OF THE INVENTION

In view of the foregoing background, it is therefore an object of the present invention to provide a window cleansing system for vehicles. These and other objects, features, and advantages of the invention are provided by a window cleaning system for washing a plurality of vehicles door windows.

The window cleaning system includes a control panel including a plurality of independently operable switches that are electrically coupled thereto. Each switch generates and transmits a control signal to the control panel based upon a manual user input. Such a control panel generates and transmits an output signal in response to a corresponding one of the control signals.

A reservoir is nested within an engine compartment of the vehicle and advantageously and conveniently houses a predetermined quantity of window washing fluid therein. A plurality of power operated pumps are electrically mated to the control panel and are in fluid communication with the reservoir. Each pump is intercalated within a door frame of the vehicle and operably responsive to the output signal.

A plurality of fluid dispensing assemblies are directly and operably conjoined to the pumps respectively. Each fluid dispensing assembly is independently activated for conveniently and effectively soaking a unique one of the vehicle door windows during operating conditions. Such fluid dispensing assemblies are nested within a frame of the vehicle doors and seated along a vertical travel path of the doors windows situated within the vehicle door frames.

The fluid dispensing assemblies preferably include a plurality of rectilinear and hollow guide rails that are equidistantly spaced within the vehicle door frame. Such guide rails are horizontally stacked and extend parallel to a horizontal plane wherein the guide rails travel along an entire width of the door windows respectively. A plurality of flexible conduits are directly conjoined to an associated one of the pumps and nested through the guide rails. Such conduits have a plurality apertures equidistantly oriented along a longitudinal length thereof.

The guide rails include a plurality of openings equidistantly formed therein and aligned with the apertures respectively. A plurality of nozzles are fluidly connected directly to the guide rails in such a manner that the fluid is effectively outwardly dispersed from the conduits during operating conditions. Such nozzles may be equidistantly spaced on opposed sides of the door windows for advantageously and effectively soaking both an inner and outer surface thereof.

A plurality of fluid wiping implements are disposed within the vehicle door frames and situated above the fluid dispensing assemblies respectively. Such fluid wiping implements cooperate with the fluid dispensing assemblies such that excess fluid is advantageously automatically removed from the door windows when the door windows are biased along the vertical path between raised and lowered positions. Each of the fluid wiping implements is preferably statically affixed adjacent to a top opening of the vehicle doors respectively. Such fluid wiping implements include a pair of coextensively shaped squeegees equidistantly seated on opposite sides of the door windows respectively that remain stationary as the door windows are toggled between raised and lowered positions. The squeegees may be disposed along a top slot of the door windows in such a manner that the door windows effectively pass therebetween during operating conditions.

A plurality of elongated collection bins include a plurality of funnels directly attached to a top surface thereof respectively. Such collection bins are suitably sized and shaped for effectively receiving and storing runoff fluids from the door windows after the door windows have been cleaned. The collection bins include a plurality of plugs removably connected thereto for conveniently and effectively draining runoff water outwardly and away from the vehicle doors. A plurality of filters are seated subjacent to the funnels. Such filters advantageously and effectively prevent undesirable debris from being deposited into the collection bins during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
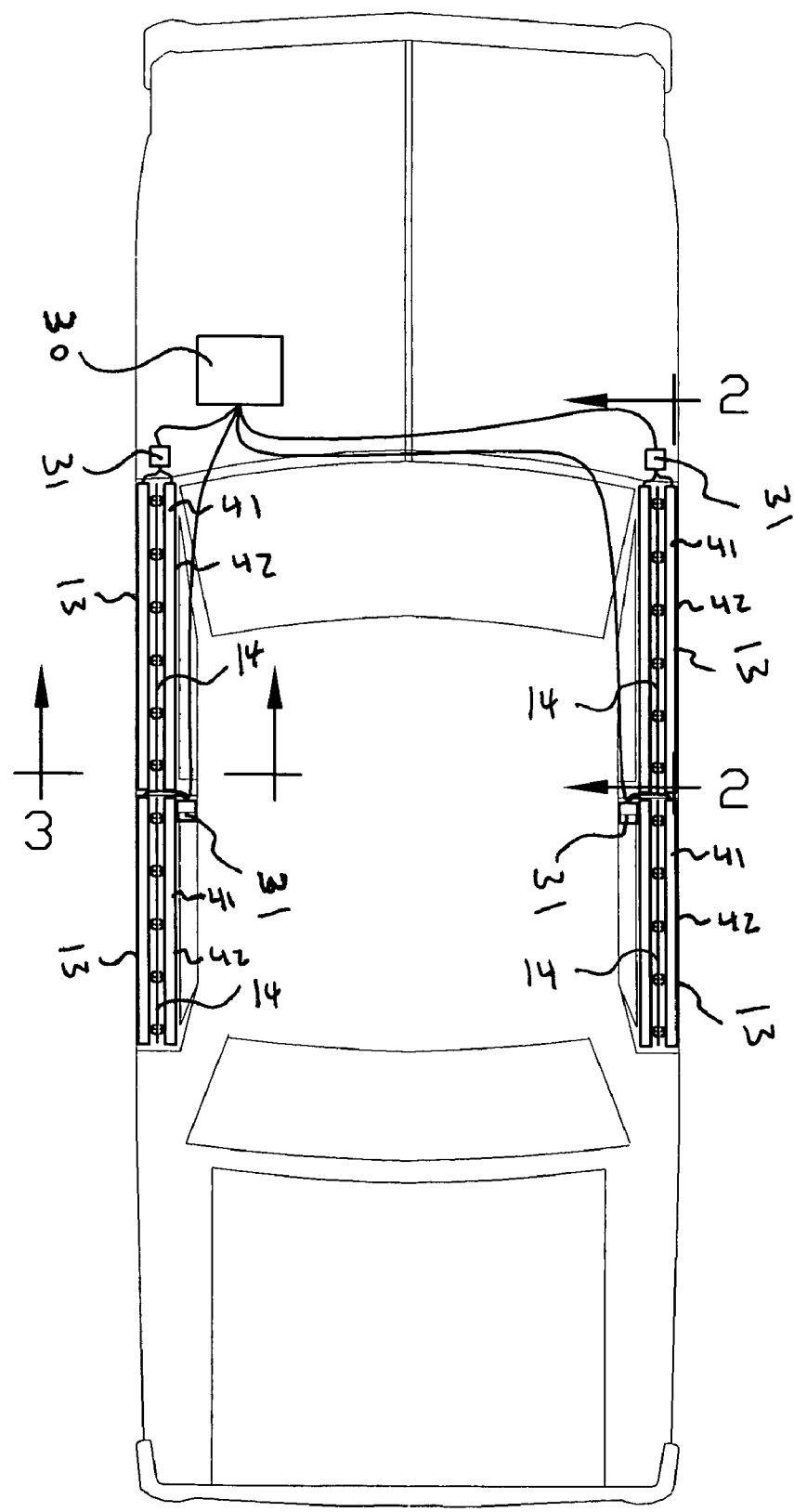
FIG. 1 is a top plan view showing a window cleaning system for vehicles, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-4 by the reference numeral 10 and is intended to provide a window cleansing system for vehicles. It should be understood that the system 10 may be used to cleanse the windows of many different types of vehicles and should not be limited in use to only small passenger automobiles.

Figure 4:
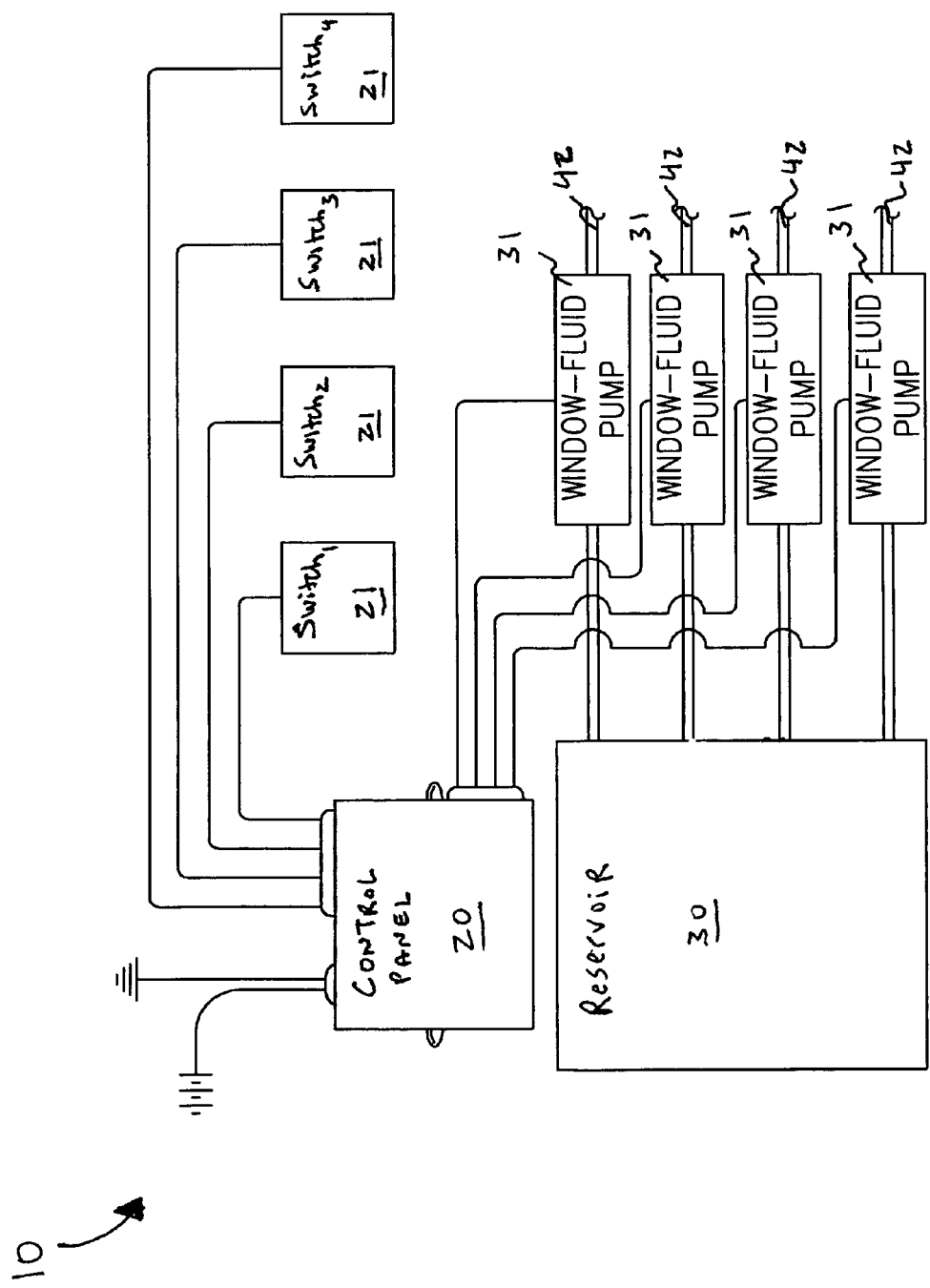
FIG. 4 is a schematic diagram of the system shown in FIG. 1.

Referring to FIG. 4, the assembly 10 includes a control panel 20 including a plurality of independently operable switches 21 that are electrically coupled thereto. Each switch 21 generates and transmits a control signal to the control panel 20 based upon a manual user input. Such a control panel 20 effectively generates and transmits an output signal in response to a corresponding one of the control signals.

Figure 2:
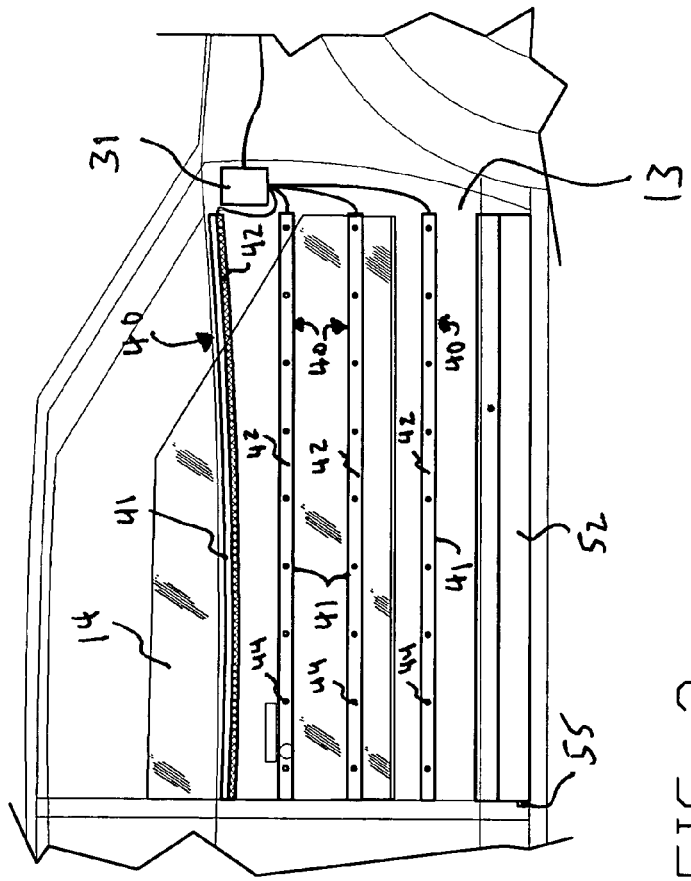
FIG. 2 is a cross-sectional view of the system shown in FIG. 1, taken along line 2-2.

Referring to FIGS. 1, 2 and 4, a reservoir 30 is nested within an engine compartment 12 of the vehicle 11 and advantageously and conveniently houses a predetermined quantity of window washing fluid therein. A plurality of power operated pumps 31 are electrically mated to the control panel 20 and are in fluid communication with the reservoir 30. Each pump 31 is intercalated within a door frame 13 of the vehicle 11 and is operably responsive to the output signal.

Figure 3:
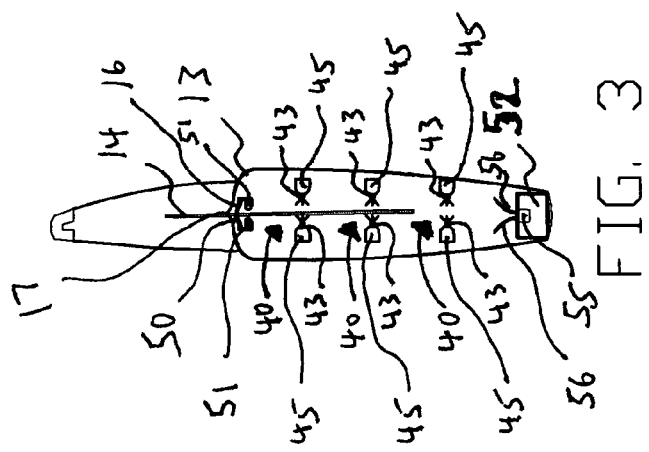
FIG. 3 is a cross-sectional view of the system shown in FIG. 1, taken along line 3-3.

Referring to FIGS. 1, 2 and 3, a plurality of fluid dispensing assemblies 40 are directly and operably conjoined, without the use of intervening elements, to the pumps 31 respectively. Each fluid dispensing assembly 40 is independently activated for conveniently and effectively soaking a unique one of the vehicle door windows 14 during operating conditions. This advantageously and conveniently allows the user to selectively clean any combination of one, two, three or four windows 14 simultaneously or independently, depending on which switches 21 are activated, thus making the system 10 extremely versatile and convenient to use. Such fluid dispensing assemblies 40 are nested within a frame 13 of the vehicle doors and seated along a vertical travel path of the doors windows 14 situated within the vehicle door frames 13.

Still referring to FIGS. 1 through 3, the fluid dispensing assemblies 40 include a plurality of rectilinear and hollow guide rails 41 that are equidistantly spaced within the vehicle door frame 13. Such guide rails 41 are horizontally stacked and extend parallel to a horizontal plane wherein the guide rails 41 travel along an entire width of the door windows 14 respectively. Of course, the guide rails 41 may be alternately positioned while still traveling along an entire width of the windows 14, as is obvious to a person of ordinary skill in the art.

A plurality of flexible conduits 42 are directly conjoined, without the use of intervening elements, to an associated one of the pumps 31 and nested through the guide rails 41. Such conduits 42 have a plurality apertures 43 equidistantly oriented along a longitudinal length thereof. The guide rails 41 include a plurality of openings 44 equidistantly formed therein and aligned with the apertures 43 respectively.

A plurality of nozzles 45 are fluidly connected directly, without the use of intervening elements, to the guide rails 41 in such a manner that the fluid is effectively outwardly dispersed from the conduits 42 during operating conditions. Such nozzles 45 are equidistantly spaced on opposed sides 15 of the door windows 14, which is essential and advantageous for effectively soaking both an inner 15A and an outer 15B surface thereof.

Referring to FIGS. 2 and 3, a plurality of fluid wiping implements 50 are disposed within the vehicle door frames 13 and situated above the fluid dispensing assemblies 40 respectively. Such fluid wiping implements 50 cooperate with the fluid dispensing assemblies 40, which is important such that excess fluid is advantageously automatically removed from the door windows 14 when the door windows 14 are biased along the vertical path between raised and lowered positions. Each of the fluid wiping implements 50 is statically affixed adjacent to a top opening 16 of the vehicle doors respectively. Such fluid wiping implements 50 include a pair of coextensively shaped squeegees 51 equidistantly seated on opposite sides of the door windows 14 respectively that remain stationary as the door windows 14 are toggled between raised and lowered positions. The squeegees 51 are disposed along a top slot 17 of the door windows 14 in such a manner that the door windows 14 effectively pass therebetween during operating conditions.

Still referring to FIGS. 2 and 3, a plurality of elongated collection bins 52 include a plurality of funnels 53 directly attached, without the use of intervening elements, to a top surface 54 thereof respectively. Such collection bins 52 are suitably sized and shaped for effectively receiving and storing runoff fluids from the door windows 14 after the door windows 14 have been cleaned. The collection bins 52 include a plurality of plugs 55 removably connected thereto, which is vital and advantageous for conveniently and effectively draining runoff water outwardly and away from the vehicle doors. A plurality of filters 56 are seated subjacent to the funnels 53. Such filters 56 are crucial for advantageously and effectively preventing undesirable debris from being deposited into the collection bins 52 during operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A window cleaning system for washing a plurality of vehicles door windows, said window cleaning system comprising:
    a control panel including a plurality of independently operable switches electrically coupled thereto, each said switches generating and transmitting a control signal to said control panel based upon a manual user input, said control panel generating and transmitting an output signal in response to a corresponding one of said control signals;
    a reservoir nested within an engine compartment of the vehicle and housing a predetermined quantity of window washing fluid therein;
    a plurality of power operated pumps electrically mated to said control panel and in fluid communication with said reservoir, each said pumps being intercalated within a door frame of the vehicle and operably responsive to said output signal;
    a plurality of fluid dispensing assemblies directly and operably conjoined to said pumps respectively, each said fluid dispensing assemblies being independently activated for soaking a unique one of the vehicle door windows during operating conditions, said fluid dispensing assemblies being nested within a frame of the vehicle doors and seated along a vertical travel path of the doors windows situated within the vehicle door frames; and
    a plurality of fluid wiping implements disposed within the vehicle door frames and situated above said fluid dispensing assemblies respectively, said fluid wiping implements cooperating with said fluid dispensing assemblies such that excess fluid is automatically removed from the door windows when the door windows are biased along the vertical path between raised and lowered positions;
    wherein each said fluid dispensing assemblies comprises
    a plurality of rectilinear and hollow guide rails equidistantly spaced within the vehicle door frame, said guide rails being horizontally stacked and extending parallel to a horizontal plane wherein said guide rails travel along an entire width of the door windows respectively;
    a plurality of flexible conduits directly conjoined to an associated one of said pumps and nested through said guide rails, said conduits having a plurality apertures equidistantly oriented along a longitudinal length thereof;
    wherein said guide rails include a plurality of openings equidistantly formed therein and aligned with said apertures respectively; and
    a plurality of nozzles fluidly connected directly to said guide rails in such a manner that the fluid is outwardly dispersed from said conduits during operating conditions.

2. The system of claim 1, wherein said nozzles are equidistantly spaced on opposed sides of the door windows for soaking both an inner and outer surface thereof.

3. The system of claim 1, wherein each said fluid wiping implements is statically affixed adjacent a top opening of the vehicle doors respectively, said fluid wiping implements including a pair of coextensively shaped squeegees equidistantly seated on opposite sides of the door windows respectively and remaining stationary as the door windows are toggled between raised and lowered positions.

4. The system of claim 3, wherein said squeegees are disposed along a top slot of the door windows in such a manner that the door windows pass therebetween during operating conditions.

5. A window cleaning system for washing a plurality of vehicles door windows, said window cleaning system comprising:
    a control panel including a plurality of independently operable switches electrically coupled thereto, each said switches generating and transmitting a control signal to said control panel based upon a manual user input, said control panel generating and transmitting an output signal in response to a corresponding one of said control signals;
    a reservoir nested within an engine compartment of the vehicle and housing a predetermined quantity of window washing fluid therein;
    a plurality of power operated pumps electrically mated to said control panel and in fluid communication with said reservoir, each said pumps being intercalated within a door frame of the vehicle and operably responsive to said output signal;
    a plurality of fluid dispensing assemblies directly and operably conjoined to said pumps respectively, each said fluid dispensing assemblies being independently activated for soaking a unique one of the vehicle door windows during operating conditions, said fluid dispensing assemblies being nested within a frame of the vehicle doors and seated along a vertical travel path of the doors windows situated within the vehicle door frames;
    a plurality of fluid wiping implements disposed within the vehicle door frames and situated above said fluid dispensing assemblies respectively, said fluid wiping implements cooperating with said fluid dispensing assemblies such that excess fluid is automatically removed from the door windows when the door windows are biased along the vertical path between raised and lowered positions; and a plurality of elongated collection bins including a plurality of funnels directly attached to a top surface thereof respectively, said collection bins being suitably sized and shaped for receiving and storing runoff fluids from the door windows after the door windows have been cleaned, said collection bins including a plurality of plugs removably connected thereto for draining runoff water outwardly and away from the vehicle doors.

6. The system of claim 5, wherein each said fluid dispensing assemblies comprises:
   a plurality of rectilinear and hollow guide rails equidistantly spaced within the vehicle door frame, said guide rails being horizontally stacked and extending parallel to a horizontal plane wherein said guide rails travel along an entire width of the door windows respectively;
   a plurality of flexible conduits directly conjoined to an associated one of said pumps and nested through said guide rails, said conduits having a plurality apertures equidistantly oriented along a longitudinal length thereof;
   wherein said guide rails include a plurality of openings equidistantly formed therein and aligned with said apertures respectively; and
   a plurality of nozzles fluidly connected directly to said guide rails in such a manner that the fluid is outwardly dispersed from said conduits during operating conditions.

7. The system of claim 6, wherein said nozzles are equidistantly spaced on opposed sides of the door windows for soaking both an inner and outer surface thereof.

8. The system of claim 5, wherein each said fluid wiping implements is statically affixed adjacent a top opening of the vehicle doors respectively, said fluid wiping implements including a pair of coextensively shaped squeegees equidistantly seated on opposite sides of the door windows respectively and remaining stationary as the door windows are toggled between raised and lowered positions.

9. The system of claim 8, wherein said squeegees are disposed along a top slot of the door windows in such a manner that the door windows pass therebetween during operating conditions.

10. A window cleaning system for washing a plurality of vehicles door windows, said window cleaning system comprising:
    a control panel including a plurality of independently operable switches electrically coupled thereto, each said switches generating and transmitting a control signal to said control panel based upon a manual user input, said control panel generating and transmitting an output signal in response to a corresponding one of said control signals;
    a reservoir nested within an engine compartment of the vehicle and housing a predetermined quantity of window washing fluid therein;
    a plurality of power operated pumps electrically mated to said control panel and in fluid communication with said reservoir, each said pumps being intercalated within a door frame of the vehicle and operably responsive to said output signal;
    a plurality of fluid dispensing assemblies directly and operably conjoined to said pumps respectively, each said fluid dispensing assemblies being independently activated for soaking a unique one of the vehicle door windows during operating conditions, said fluid dispensing assemblies being nested within a frame of the vehicle doors and seated along a vertical travel path of the doors windows situated within the vehicle door frames;
    a plurality of fluid wiping implements disposed within the vehicle door frames and situated above said fluid dispensing assemblies respectively, said fluid wiping implements cooperating with said fluid dispensing assemblies such that excess fluid is automatically removed from the door windows when the door windows are biased along the vertical path between raised and lowered positions;
    a plurality of elongated collection bins including a plurality of funnels directly attached to a top surface thereof respectively, said collection bins being suitably sized and shaped for receiving and storing runoff fluids from the door windows after the door windows have been cleaned, said collection bins including a plurality of plugs removably connected thereto for draining runoff water outwardly and away from the vehicle doors; and
    a plurality of filters seated subjacent said funnels, said filters preventing undesirable debris from being deposited into said collection bins during operating conditions.

11. The system of claim 10, wherein each said fluid dispensing assemblies comprises:
    a plurality of rectilinear and hollow guide rails equidistantly spaced within the vehicle door frame, said guide rails being horizontally stacked and extending parallel to a horizontal plane wherein said guide rails travel along an entire width of the door windows respectively;
    a plurality of flexible conduits directly conjoined to an associated one of said pumps and nested through said guide rails, said conduits having a plurality apertures equidistantly oriented along a longitudinal length thereof;
    wherein said guide rails include a plurality of openings equidistantly formed therein and aligned with said apertures respectively; and
    a plurality of nozzles fluidly connected directly to said guide rails in such a manner that the fluid is outwardly dispersed from said conduits during operating conditions.

12. The system of claim 11, wherein said nozzles are equidistantly spaced on opposed sides of the door windows for soaking both an inner and outer surface thereof.

13. The system of claim 10, wherein each said fluid wiping implements is statically affixed adjacent a top opening of the vehicle doors respectively, said fluid wiping implements including a pair of coextensively shaped squeegees equidistantly seated on opposite sides of the door windows respectively and remaining stationary as the door windows are toggled between raised and lowered positions.

14. The system of claim 13, wherein said squeegees are disposed along a top slot of the door windows in such a manner that the door windows pass therebetween during operating conditions.

* * * * *